US009171491B1

(12) United States Patent
Kwon et al.

(10) Patent No.: US 9,171,491 B1
(45) Date of Patent: Oct. 27, 2015

(54) OVER-DRIVING CIRCUIT AND DISPLAY DEVICE HAVING AN OVER-DRIVING CIRCUIT

(71) Applicant: LG Display Co., Ltd., Seoul (KR)

(72) Inventors: Kyungjoon Kwon, Gyeonggi-do (KR); Sungjo Koo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/576,580

(22) Filed: Dec. 19, 2014

(30) Foreign Application Priority Data

Sep. 19, 2014 (KR) ........................ 10-2014-0124905

(51) Int. Cl.

| | |
|---|---|
| ***G09G 3/20*** | (2006.01) |
| ***G09G 3/36*** | (2006.01) |
| ***G09G 3/30*** | (2006.01) |
| ***G06F 3/038*** | (2013.01) |
| ***G09G 5/00*** | (2006.01) |
| ***G09G 5/10*** | (2006.01) |
| ***H04N 9/64*** | (2006.01) |
| ***G06K 9/36*** | (2006.01) |
| ***G06K 9/46*** | (2006.01) |

(52) U.S. Cl.
CPC ............ *G09G 3/2003* (2013.01); *G09G 3/3648* (2013.01); *G09G 2320/0666* (2013.01); *G09G 2340/06* (2013.01); *G09G 2360/12* (2013.01)

(58) Field of Classification Search
CPC ....................... G09G 2340/02; G09G 2340/16
See application file for complete search history.

(56) References Cited

U.S. PATENT DOCUMENTS

| | | | | |
|---|---|---|---|---|
| 7,898,518 | B2 | 3/2011 | Hong et al. | |
| 7,948,465 | B2 | 5/2011 | Cho et al. | |
| 8,049,691 | B2 * | 11/2011 | Pan et al. | 345/87 |
| 8,314,761 | B2 * | 11/2012 | Takada et al. | 345/88 |
| 8,330,699 | B2 | 12/2012 | Hong et al. | |
| 2006/0214942 | A1 * | 9/2006 | Tanase et al. | 345/589 |
| 2008/0150863 | A1 * | 6/2008 | Morisue et al. | 345/88 |
| 2011/0025680 | A1 * | 2/2011 | Kim et al. | 345/214 |
| 2011/0090381 | A1 * | 4/2011 | Cote et al. | 348/246 |
| 2011/0243465 | A1 * | 10/2011 | Lin et al. | 382/233 |
| 2011/0255778 | A1 * | 10/2011 | Hashimoto et al. | 382/166 |
| 2012/0154345 | A1 * | 6/2012 | Kim | 345/204 |
| 2012/0268353 | A1 * | 10/2012 | Mizukoshi et al. | 345/76 |
| 2013/0002618 | A1 * | 1/2013 | Furihata et al. | 345/204 |
| 2013/0010014 | A1 * | 1/2013 | Hasegawa et al. | 345/690 |
| 2014/0043357 | A1 * | 2/2014 | Yamato et al. | 345/603 |
| 2014/0104259 | A1 * | 4/2014 | Oh et al. | 345/212 |

* cited by examiner

*Primary Examiner* — Lin Li
(74) *Attorney, Agent, or Firm* — Morgan, Lewis & Bockius LLP

(57) ABSTRACT

An over-driving circuit for a display device having a display panel includes a first 4-color data generation module configured to generate output 4-color data of the previous frame based on 3-color data and a gain of the previous frame, and to generate output 4-color data of the current frame based on 3-color data and a gain of the current frame. The over-driving circuit also includes a second 4-color data generation module configured to generate input 4-color data based on input 3-color data and the gain of the current frame. The over-driving circuit further includes a data modulator configured to generate modulated data based on the output 4-color data of the previous frame, the output 4-color data of the current frame, and the input 4-color data.

19 Claims, 8 Drawing Sheets

FIG. 6

| | | | |
|---|---|---|---|
| YUV | YUV | YUV | YUV |
| YUV | YUV | YUV | YUV |

FIG. 7

| | | | |
|---|---|---|---|
| A | A | B | A |
| A | B | B | B |

FIG. 8

| | | | |
|---|---|---|---|
| 1 | 1 | 0 | 1 |
| 1 | 0 | 0 | 0 |

OVER-DRIVING CIRCUIT AND DISPLAY DEVICE HAVING AN OVER-DRIVING CIRCUIT

This application claims the benefit of Korean Patent Application No. 10-2014-0124905 filed in Korea on Sep. 19, 2014, which is incorporated herein by reference for all purposes as if fully asset forth herein.

BACKGROUND OF THE INVENTION

1. Field of the Invention

The present invention relates to a display device and, more particularly, to an over-driving circuit for a display device and a display device having an over-driving circuit.

2. Discussion of the Related Art

There are various types of flat panel displays being developed, which include a liquid crystal display (LCD) device, an organic light emitting diode (OLED) display, a plasma display panel (PDP), and electrophoretic display (EPD) device. The liquid crystal display device displays images by controlling an electric field applied to liquid crystal molecules according to a data voltage. In an active matrix driving type liquid crystal display device, each pixel has a thin film transistor (hereinafter, TFT).

As shown in FIG. 1, when data voltage VD changes from the previous data voltage level to the current data voltage level, the corresponding brightness BL may not reach a desired level due to the slow response speed of the liquid crystal display. Using an over-driving method, the liquid crystal display is able to compensate for the slow response speed caused by the unique characteristics of liquid crystal, such as viscosity and elasticity. In an over-driving method applicable to an RGB-type display device (i.e., a display device having Red, Green, and Blue pixels), the slow response time of liquid crystals can be improved by comparing an input data of the previous frame and an input data of the current frame, and if there is any data difference between them, modulating the input data of the current frame using a preset modulation value so as to increase the amount of change. As shown in FIG. 2, the over-driving method applicable to an RGB-type display device can achieve a desired brightness level MBL by modulating input data voltage VD using the preset modulation value and applying the modulated data voltage MVD to liquid crystal cells. In this over-driving method, the data voltage level is increased on the basis of a data change, in order to obtain the desired brightness corresponding to the brightness value of the input data within one frame period.

Display devices whose pixels include W (white) subpixels, in addition to R (red) subpixels, G (green) subpixels, and B (blue) subpixels, are currently under development. Herein, a display device whose pixels are divided into R, G, B, and W subpixels is referred to as a "RGBW-type display device." The W subpixels can reduce power consumption because they can increase the brightness of each pixel. However, applying the above over-driving method to the RGBW-type display device involves storing RGBW data of four colors in a frame memory, which is accompanied by the problem of having to increase the frame memory capacity. Also, there is no standard method of converting RGBW data into brightness and color difference information, and an over-driving circuit for the RGB-type display device is not compatible with an over-driving circuit for the RGBW-type display device. For this reason, there is a need to develop a new over-driving circuit applicable to the RGBW-type display device.

SUMMARY OF THE INVENTION

Accordingly, the present invention relates to an over-driving circuit for a display device that substantially obviates one or more of the problems due to limitations and disadvantages of the related art.

An object of the present invention is to provide an over-driving circuit for a display device which allows over-driving of an RGBW-type display device without increasing the frame memory capacity and is compatible for both RGBW-type and RGB-type display devices.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an over-driving circuit for a display device having a display panel includes: a first 4-color data generation module configured to determine 4-color data of the previous frame based on 3-color data of the previous frame and 4-color data of the current frame based on 3-color data of the current frame, to generate output 4-color data of the previous frame based on the 4-color data and a gain of the previous frame, and to generate output 4-color data of the current frame based on the 4-color data and a gain of the current frame; a second 4-color data generation module configured to generate input 4-color data based on input 3-color data and the gain of the current frame; a first delay unit configured to delay the input 4-color data from the second 4-color data generation module; and a data modulator configured to generate modulated data based on the output 4-color data of the previous frame, the output 4-color data of the current frame, and the delayed input 4-color data.

In another aspect, a display device includes: a display panel having a plurality of data lines, a plurality of gate lines crossing the data lines, and a plurality of pixels arranged in a matrix form; a data driver configured to supply data voltages to the data lines based on modulated data; a timing controller configured to control the data driver; and an over-driving circuit configured to receive input 3-color data and to generate the modulated data, the over-driving circuit including: a first 4-color data generation module configured to determine 4-color data of the previous frame based on 3-color data of the previous frame and 4-color data of the current frame based on 3-color data of the current frame, to generate output 4-color data of the previous frame based on the 4-color data and a gain of the previous frame, and to generate output 4-color data of the current frame based on the 4-color data and a gain of the current frame; a second 4-color data generation module configured to generate input 4-color data based on the input 3-color data and the gain of the current frame; a first delay unit configured to delay the input 4-color data from the second 4-color data generation module; and a data modulator configured to generate the modulated data based on the output 4-color data of the previous frame, the output 4-color data of the current frame, and the delayed input 4-color data.

In yet another aspect, a display device include: a display panel having a plurality of data lines, a plurality of gate lines crossing the data lines, and a plurality of pixels arranged in a matrix form; a data driver configured to supply data voltages to the data lines based on modulated data; a timing controller configured to control the data driver; and an over-driving circuit configured to receive input 3-color data and to generate the modulated data, the over-driving circuit including: a first 4-color data generation module configured to generate output 4-color data of the previous frame based on 3-color data of the previous frame, and to generate output 4-color data of the current frame based on 3-color data of the current frame obtained from the input 3-color data; a second 4-color data generation module configured to generate input 4-color data from the input 3-color data; a first multiplexer configured to select either the 3-color data of the previous frame or the output 4-color data of the previous frame; a second multiplexer configured to select either the 3-color data of the current frame or the output 4-color data of the current frame; a third multiplexer configured to select either the input 3-color data or the input 4-color data; and a data modulator configured to generate the modulated data based on the data selected by at least one of the first, second, and third multiplexers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6 to 8 show a BTC compression algorithm;

DETAILED DESCRIPTION OF THE ILLUSTRATED EMBODIMENTS

Figure 1:
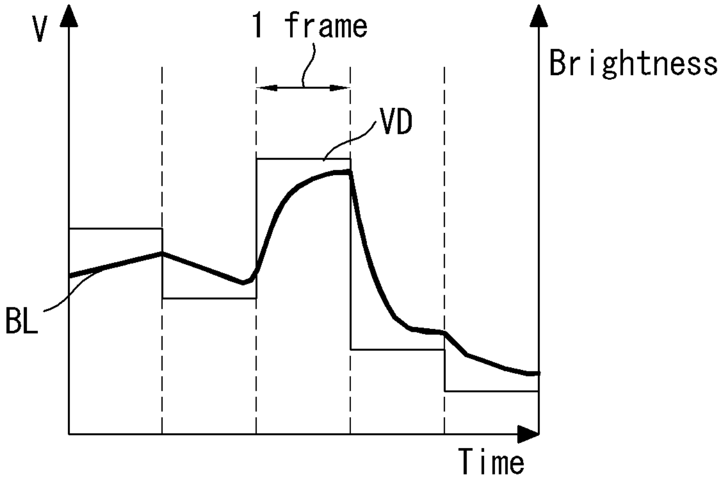
FIG. 1 is a waveform diagram showing response characteristics of a related art liquid crystal display.
Figure 2:
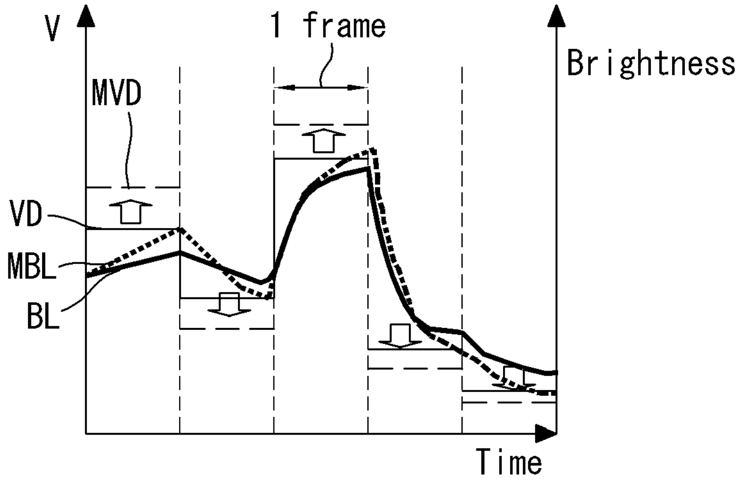
FIG. 2 is a waveform diagram showing an over-driving method for an RGB-type display device.

Hereinafter, example embodiments of the present invention will be described in detail with reference to the accompanying drawings. Throughout the specification, the same reference numerals may indicate substantially the same components.

Now, example embodiments of the present invention will be described with reference to FIGS. 3 to 12.

Figure 3:
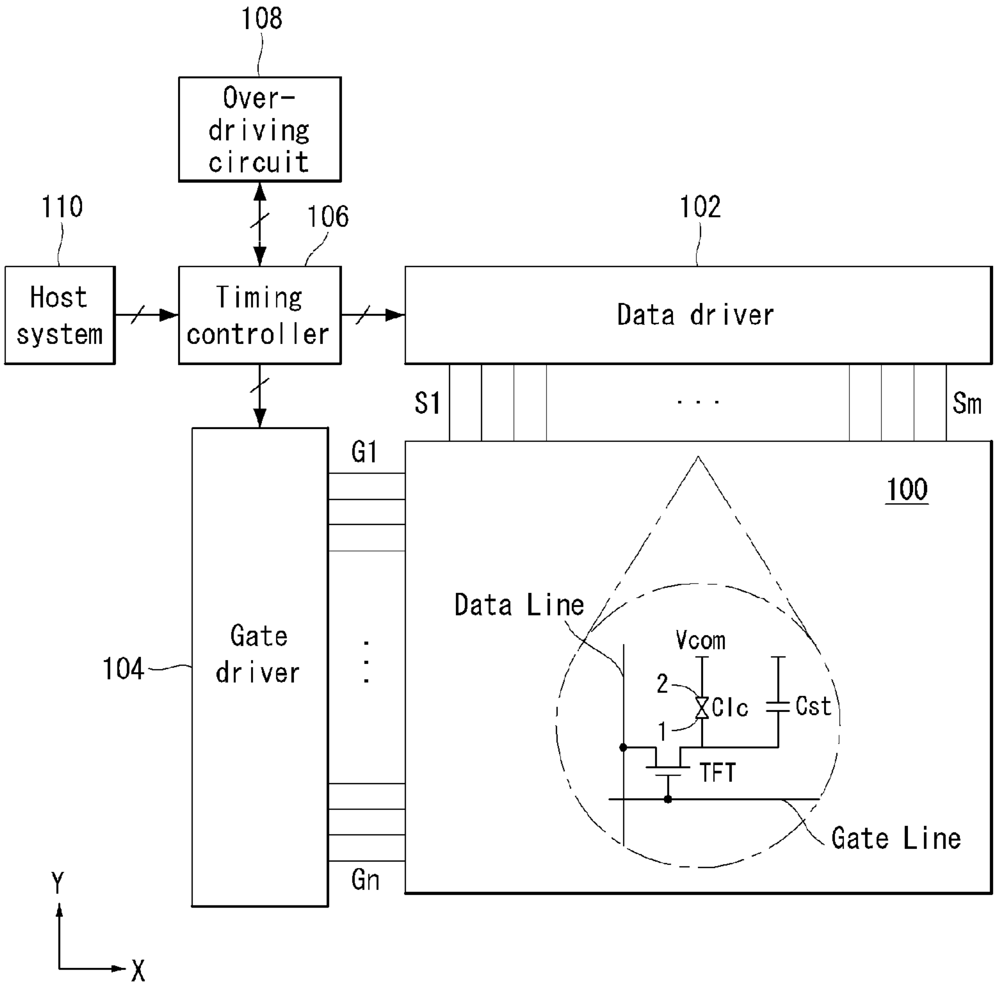
FIG. 3 is a diagram showing a display device according to an example embodiment of the present invention.

As shown in FIG. 3, a display device according to an example embodiment of the present invention comprises a display panel 100 where data lines S1 to Sm and gate lines G1 to Gn cross each other and pixels are arranged in a matrix form, where m and n each represent an integer. The display device also includes a data driver 102 for supplying data to the data lines S1 to Sm of the display panel 100, and a gate driver 104 for supplying a scan pulse to the gate lines G1 to Gn of the display panel 100. The display device includes an over-driving circuit 108 for modulating source data, which has been compressed and decompressed, using preset modulation value. The display device further includes a timing controller 106 that controls the data driver 102 and the gate driver 104 and supplies the data RGB to the over-driving circuit 108.

An input image is displayed on a pixel array of the display panel 100. Each of the pixels comprises a thin film transistor (hereinafter, "TFT") connected to a pixel electrode 1 and a storage capacitor Cst for maintaining the voltage of the liquid crystal cell. The TFTs are formed at the crossings of the data lines S1 to Sm and the gate lines G1 to Gn. The TFTs are configured to supply the data voltage from the data lines S1 to Sm to the pixel electrodes in response to a gate pulse to the gate lines G1 to Gn. The storage capacitors Cst may be formed between the liquid crystal cells Clc and the front gate lines G1 to Gn, or between the liquid crystal cells Clc and a separate common line. The TFTs may be implemented as amorphous Si (a-Si) TFTs, LTPS (Low Temperature Polysilicon) TFTs, oxide TFTs, or other known TFTs.

A color filter array comprising a black matrix BM and color filters may be formed on an upper substrate of the display panel 100. The common electrode 2 is formed on the upper substrate in displays employing a vertical electric field driving method, such as a twisted nematic (TN) mode or a vertical alignment (VA) mode. On the other hand, the common electrode 2 is formed on the lower substrate together with the pixel electrode 1 in displays employing a horizontal electric field driving, method such as an in plane switching (IPS) mode or a fringe field switching (FFS) mode. Polarizers may be formed on the upper and lower substrates, respectively, and alignment layers may be formed on the substrates to set a pre-tilt angle of liquid crystals.

A liquid crystal display device of the present invention may be implemented in any form, including a transmissive liquid crystal display, a semi-transmissive liquid crystal display, and a reflective liquid crystal display. The transmissive liquid crystal display and the semi-transmissive liquid crystal display employ a backlight unit. The backlight unit may be a direct type backlight unit or an edge type backlight unit.

A display panel driving circuit supplies input image data to the pixels. Each of the pixels comprises a red (R) subpixel, a green (G) subpixel, and a blue (B) subpixel, and may further comprises a white (W) subpixel.

The data driver 102 comprises a plurality of source drive ICs. Output channels of the source drive ICs may be connected respectively to the data lines Si to Sm of the pixel array. The source drive ICs receive a digital video data of an input image from the timing controller 106. The digital video data transmitted to the source drive ICs is the modulated data produced by the over-driving circuit 108. The over-driving modulated data comprises red (R) data, green (G) data, and blue (B) data, and may also comprise white (W) data. The source drive ICs convert the digital video data of the input image into a positive/negative gamma compensation voltage and outputs a positive/negative data voltage under the control of the timing controller 106. The output voltage of the source drive ICs is supplied to the data lines S1 to Sm. The source drive ICs may each invert the polarity of the data voltage to be supplied to the pixels and output the data voltage to the data lines S1 to Sm under the control of the timing controller 106.

The gate driver 104 supplies a gate pulse synchronized with the data voltage to the gate lines G1 to Gn under the control of the timing controller 106.

The timing controller 106 may convert RGB data of an input image received from a host system 110 into RGBW data and transmit it to the data driver 102. An interface for data transmission between the timing controller 106 and the source drive ICs of the data driver 102 may be a mini LVDS (low-voltage differential signaling) interface or EPI (embedded panel interface) interface. The EPI interface can be adopted using any of the interface technologies disclosed in U.S. patent application Ser. No. 12/543,996 filed on Aug. 19, 2009, now U.S. Pat. No. 8,330,699; U.S. patent application Ser. No. 12/461,652 filed on Aug. 19, 2009, now U.S. Pat. No. 7,898,518; and U.S. patent application Ser. No. 12/537,341 filed on Aug. 7, 2009, now U.S. Pat. No. 7,948,465.

The timing controller 106 receives timing signals synchronized with input image data from the host system 110. The timing signals may comprise a vertical synchronization signal Vsync, a horizontal synchronization signal Hsync, a data enable signal DE, and a main clock DCLK. The timing controller 106 controls the operation timings of the data driver 102, and the gate driver 104 based on the timing signals Vsync, Hsync, DE, and DCLK received together with the pixel data of the input image. The timing controller 106 may transmit a polarity control signal for controlling the polarity of the pixel array to the source drive ICs of the data driver 102. The mini LVDS interface transmits the polarity control signal through a separate control line. The EPI interface is the interface technology which encodes polarity control information in a control data packet transmitted between a clock training pattern for CDR (clock and data recovery) and an RGBW data packet, and transmits it to each of the source drive ICs.

The timing controller 106 may covert RGB data of an input image into RGBW data by using a white gain calculation algorithm. Any white gain calculation algorithm known to those skilled in the art may be employed.

The host system 110 may be implemented as one of a television system, a set-top box, a navigation system, a DVD player, a Blu-ray player, a personal computer (PC), a home theater system, a phone system, and any other systems incorporating or used in combination with a display.

The over-driving circuit 108 compresses and decompress data, and compares previous frame data and current frame data. The over-driving circuit 108 then modulates source data RGB from the timing controller 106 using preset modulation data according to the comparison result and supplies the modulated data to the timing controller 106. The modulation data may be stored in a memory, e.g., electrically erasable and programmable ROM (EEPROM), within a lookup table LUT. The over-driving circuit 108 may be embedded in the timing controller 106 or may be implemented as a separate component. If a pixel data value is higher in the current frame $F_n$ than in the previous frame $F_{n-1}$, the modulation data MRGB has a higher value than that of the current frame $F_n$. On the other hand, if the pixel data value is lower in the current frame $F_n$ than in the previous frame $F_{n-1}$, the modulation data MRGB has a lower value than that of the current frame $F_n$. If the pixel data value in the same pixel is the same in the previous frame $F_{n-1}$ and the current frame $F_n$, the modulation data MRGB has the same value as the current frame $F_n$.

Figure 4:
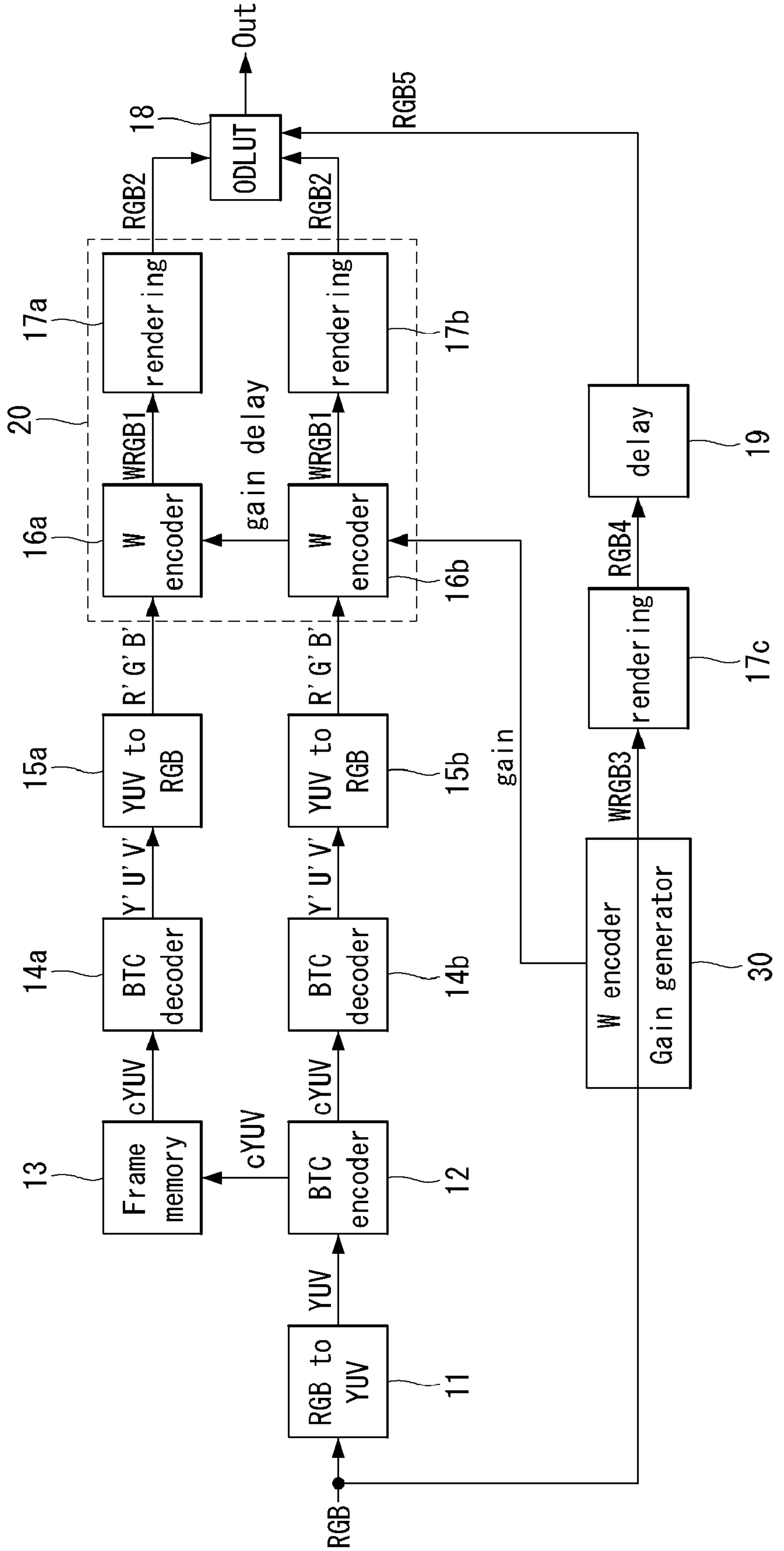
FIG. 4 shows an example of the over-driving circuit 108 shown in FIG. 3.
Figure 5:
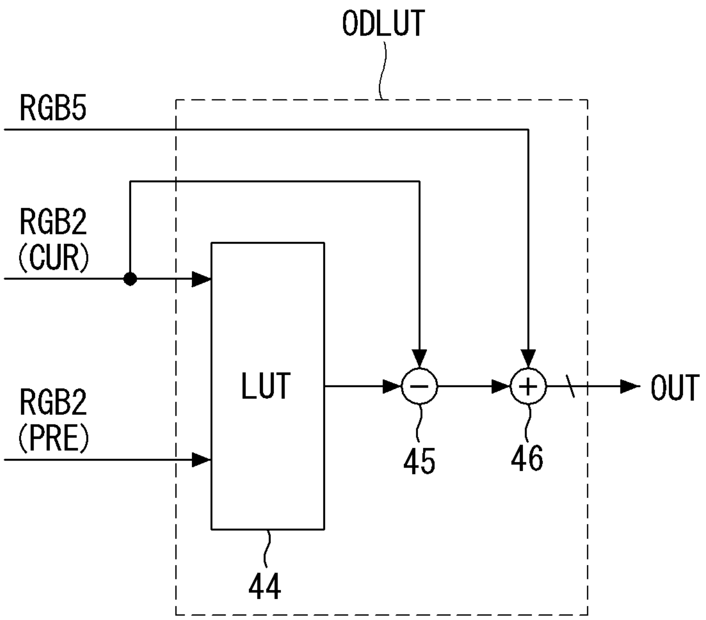
FIG. 5 shows in more detail an example of a data modulator 18 shown in FIG. 4.

FIG. 4 illustrates an example of the over-driving circuit 108 shown in FIG. 3. FIG. 5 depicts an example data modulator ODLUT 18 in more detail.

As shown in FIGS. 4 and 5, the example over-driving circuit 108 comprises a RGB to YUV data converter 11, a BTC encoder 12, a frame memory 13, first and second BTC decoders 14*a* and 14*b*, first and second YUV to RGB data converters 15*a* and 15*b*, a first W generation module 20, a data modulator ODLUT 18, a second W generation module 30, and a delay unit 19.

The RGB to YUV data converter 11 separates input RGB data into brightness data (Y) and color difference data (U,V) and outputs them to the BTC encoder 12.

The BTC encoder 12 compresses brightness data using any compression algorithm well known to those skilled in the art and supplies the compressed brightness data cYUV to the frame memory 13 and to the second BTC decoder 14*b*. As previous frame data PRE and current frame data CUR have to be input into the data modulator 18, the frame memory 13 stores the current frame data (i.e., the compressed brightness data cYUV for the current frame) and outputs it to the first BTC decoder 14*a* after a delay of one frame period. Because the frame memory 13 stores compressed brightness data cYUV, not 4-color data, its capacity can be reduced. The BTC encoder 12 compresses RGB data using a BTC (block truncation coding) compression algorithm. In the BTC compression algorithm, the mean and variance of brightness (Y) and chromaticity (U, V) of a data block for the current frame are calculated, and then pixel data having a value equal to or greater than the mean is substituted with '1' and pixel data having a value less than the mean is substituted with '0' to compress the data. This will be described in more detail in conjunction with the example of FIGS. 6 to 8. In the example of FIG. 6, if pixel data having a value equal to or greater than the mean is denoted by 'A' and pixel data having a value less than the mean is denoted by 'B', the value of 'A' is as shown in Equation 1 and the value of 'B' is as shown in Equation 2.

$$A = f_M + f_v\sqrt{\frac{N-L}{L}} \quad \text{[Equation 1]}$$

$$B = f_M + f_v\sqrt{\frac{L}{N-L}} \quad \text{[Equation 2]}$$

Here, '$f_M$' is the mean of the pixel data for the eight pixels included in the data block, and '$f_V$' is the standard deviation of the pixel data for the eight pixels. Also, N denotes the total number of pixels in the block (8 in this example), and L denotes the number of pixels in the block whose data is greater than the mean. In the example of FIG. 7, if 'A' is substituted with '1' and 'B' is substituted with "0', the result is as shown in FIG. 8. The BTC compressed data comprises 3 bytes including 1 byte of the A value, 1 byte of the B value, and 1 byte of the AB separation value. In the example of FIG. 8, the AB separation value is '11011000'. Accordingly, the 8-byte data of the 4×2 data block in the example in FIG. 8 can be compressed into 3-byte data. Although the example shown in FIGS. 6-8 uses a 4×2 data block, a different size data block, e.g., a 4×4 data block, may be employed. Also, a compression method used in the present invention is not limited to the BTC compression algorithm, but any well-known compression algorithm can be used.

The first BTC decoder 14*a* decompresses the compressed previous frame data cYUV and outputs decompressed previous frame data Y'U'V' to the first YUV to RGB data converter 15*a*. The first YUV to RGB data converter 15*a* inversely converts the decompressed previous frame data Y'U'V' into RGB data R'G'B' and outputs this RBG data to the first W generation module 20.

The second BTC decoder 14*b* decompresses the compressed current frame data cYUV and outputs the decompressed current frame data Y'U'V' to the second YUV to RGB data converter 15*b*. The second YUV to RGB data converter 15*b* inversely converts the decompressed current frame data Y'U'V' into RGB data R'G'B' and outputs this RGB data to the first W generation module 20.

Components of the over-driving circuit as shown for example in FIG. 4, other than the first and second W generation modules 20 and 30, are commonly used for both an RGB-type display device and an RGBW-type display device because those components are equally applicable for both types of display devices.

The first W generation module 20 include W encoders 16*a* and 16*b*, that respectively receive 3-color data R'G'B' of the previous frame and 3-color data R'G'B' of the current frame. Based on a spectrum exchange method, the first W generation module 20 (more specifically, the W encoders 16*a* and 16*b*) generates 4-color data RGBW from the 3-color data R'G'B' of the previous and current frames, calculates a white gain from the 4-color data, and multiplies the 4-color data by the white gain to generate final 4-color data R'G'B'W'.

White light irradiated from the white (W) subpixel comprises light of R, G, and B wavelengths. The amount of light irradiated from the RGB subpixels displaying input RGB data and the amount of light irradiated from the RGBW subpixels displaying RGBW data after conversion should be substantially equal. In the spectrum exchange method, in order to reduce the intensity of light of RGB wavelengths irradiated from the RGB subpixels by the same amount as that of the RGB wavelengths irradiated from the W subpixel, W data to be written to the W subpixel is generated, and the RGB data to be written to the RGB subpixels is subtracted.

Figure 9:
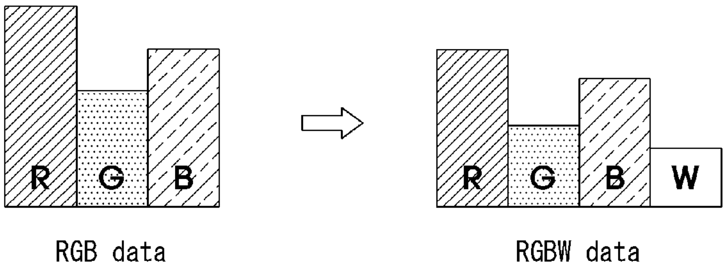
FIG. 9 shows a white data generation method.

The first W generation module 20 comprises W encoders 16*a* and 16*b*, and pixel rendering parts 17*a* and 17*b*. The first W encoder 16*a* outputs RGBW data WRGB1 from RGB data R'G'B' of the previous frame. The first W encoder 16*a* multiplies the RGBW data of the previous frame by a white gain. The second W encoder 16*b* outputs RGBW data WRGB1 from RGB data R'G'B' of the current frame. The second W encoder 16*b* multiplies RGBW data of the current frame by the white gain. The white gain supplied to the first W encoder 16*a* is delayed for one frame period in order to synchronize the RGBW data WRGB1 output from the first W encoder 16*a* and the RGBW data WRGB1 output from the second W encoder 16*b*. The white gain has a value equal to or greater than 0 and less than 1. FIG. 9 shows an example of white data W generated by W encoders. The W encoders 16*a* and 16*b* generate W data based on the common value of R data, G data, and B data. Accordingly, the W data does not affect the overall brightness.

The first pixel rendering part 17*a* renders the 4-color data WRGB1 of the previous frame according to a pixel array structure of the display panel 100. The second pixel rendering part 17*b* renders the 4-color data WRGB1 of the current frame according to the pixel array structure of the display panel 100. In an example where the pixels on the odd lines of the pixel array are arranged in the order RGBW, starting from the left, and the pixels on the even lines of the pixel array are arranged in the order BWRG, starting from the left, the pixel rendering parts 17*a* and 17*b* convert the RGBW data shown in the middle of FIG. 10 into a data format shown on the right side of FIG. 10. In this case, data that has passed through the pixel rendering parts 17*a* and 17*b* alternates in the order RGB/WRG/BWR/GBW and is supplied to the data modulator 18.

Figure 10:
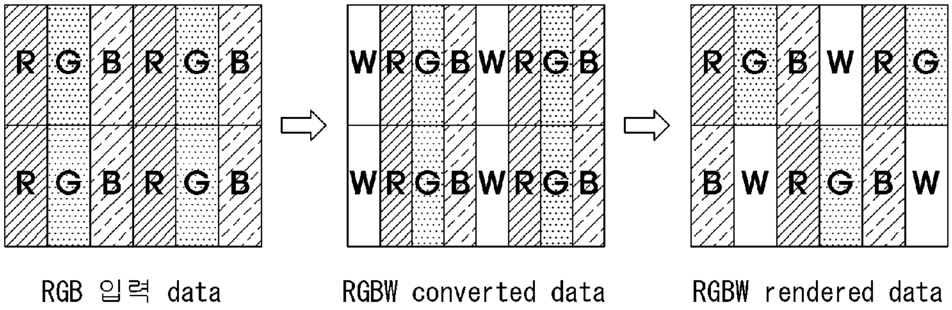
FIG. 10 shows an example of rendering RGBW data according to a pixel array structure of an RGBW-type display device.

Using the spectrum exchange method, the second W generation module 30 generates 4-color data RGBW from 3-color data RGB received through an input terminal, calculates a white gain from the 4-color data, and multiplies the 4-color data by the white gain to generate final 4-color data RGBW. The second W generation module 30 comprises a W encoder and a gain generator. The gain generator calculates the white gain from the RGBW data by using any well-known white gain calculation algorithm. The white gain is supplied to the W encoder of the second W generation module 30 and also sent to the W encoders 16*a* and 16*b* of the first W generation module 20. Based on the spectrum exchange method, the W encoder of the second W generation module 30 generates RGBW data from RGB data and multiplies the RGBW data by a white gain to output RGBW data WRGB3. The third pixel rendering part 17*c* renders the RGBW data WRGB3 from the second W generation module 30 according to the pixel array structure of the display panel 100 in the same example way as shown in FIG. 10. Data that has passed through the third pixel rendering part 17*c* is output in the same data format as the data RGB2 output from the first W generation module 20. For example, the third pixel rendering part 17*c* may supply RGBW data to the data modulator 18 in the order RGB/WRG/BWR/GBW. The third pixel rendering part 17*c* may be embedded in the second W generation module 30 as shown, for example, in FIG. 12.

The delay unit 19 delays the RGBW data WRGB3 that has passed through the third pixel rendering part 17*c*, in order to synchronize the data RGB2 and RGB5 input from the first and second W generation modules 20 and 30, respectively, to the data modulator 18.

The data modulator 18 receives the previous frame data and current frame data, compares them with each other, and outputs a modulation value for modulating the difference between them to modulate the current frame data for overdriving the display device. In the example shown in FIG. 5, the data modulator 18 comprises a look-up table 44 and further comprises a subtractor 45 and an adder 46. It should be noted that the data modulator 18 is not limited to of the example shown in FIG. 5. For instance, the data modulator 18 may be implemented as any data modulation circuit for overdriving known to those skilled in the art.

The look-up table 44 compares the current frame data RGB2(CUR) and the previous frame data RGB2(PRE), and selects preset modulation data according to the comparison result. The subtractor 45 subtracts the modulation data output by the look-up table 44 from the current frame data RGB2 (CUR) to output a preset modulation value. If the modulated data from the look-up table 44 has already been set to the preset modulation value, the subtractor 45 can be eliminated. The adder 46 adds the preset modulation value from the look-up table 44 or subtractor 45 and the current frame data RGB5 that has passed through the second W generation module 30 and the pixel rendering part 17*c*, and outputs the resulting modulated data. The adder 46 adds noncompressed data and the overdriving modulation data to output the modulated data which is losslessly compressible. The modulated data is transmitted to the source drive ICs of the data driver 102.

Figure 11:
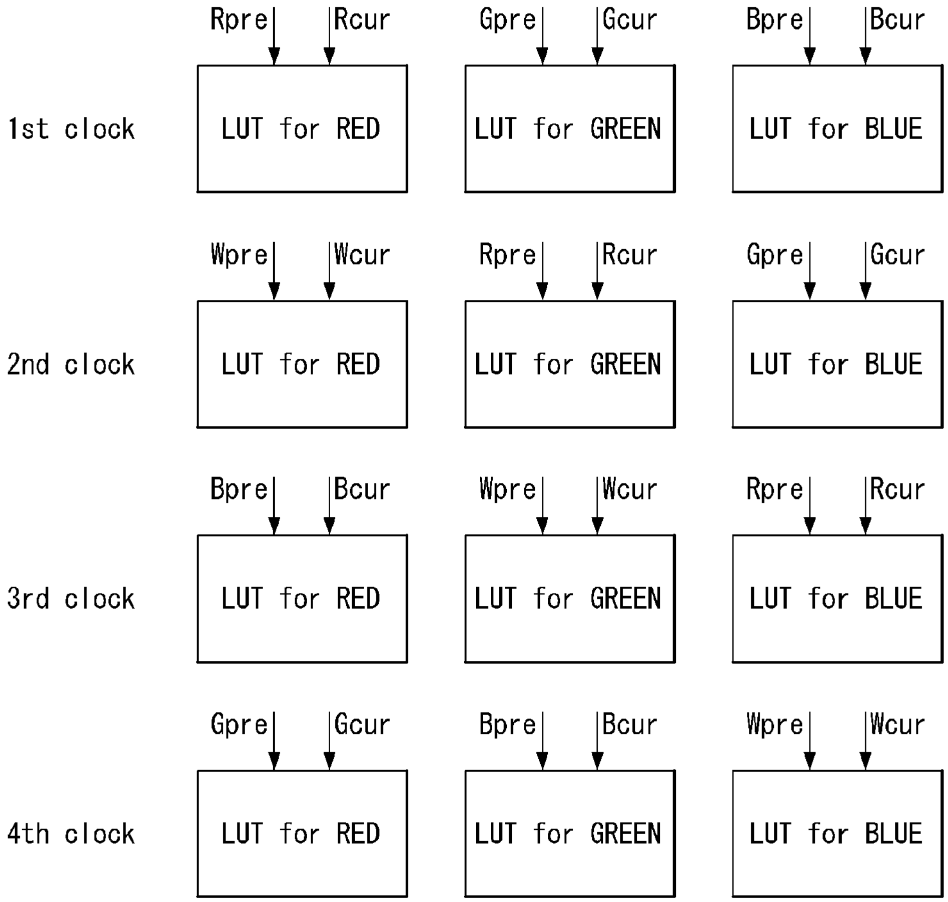
FIG. 11 shows an example operation of a data modulator.

FIG. 11 shows an example of the operation of the data modulator 18.

In the example shown in FIG. 11, the look-up table 44 comprises first to third look-up tables for processing 3-color data. RGBW data may be input into the look-up table 44 in sequence in the order RGB/WRG/BWR/GBW, in synchronization with a clock. Accordingly, the present invention is capable of modulating 4-color data by using the conventional look-up table for processing 3-color data.

A first look-up table LUT for RED compares R data Rpre of the previous frame and R data Rcur of the current frame at a first clock timing to output R modulation data. A second look-up table LUT for Green compares G data Gpre of the previous frame and G data Gcur of the current frame at the first clock timing to output G modulation data. A third look-up table LUT for Blue compares B data Bpre of the previous frame and B data Bcur of the current frame at the first clock timing to output B modulation data.

The first look-up table LUT for RED compares W data Wpre of the previous frame and W data Wcur of the current frame at a second clock timing to output W modulation data. The second look-up table LUT for Green compares R data Rpre of the previous frame and R data Rcur of the current frame at the second clock timing to output R modulation data. The third look-up table LUT for Blue compares G data Gpre of the previous frame and G data Gcur of the current frame at the second clock timing to output G modulation data.

The first look-up table LUT for RED compares B data Bpre of the previous frame and B data Bcur of the current frame at a third clock timing to output B modulation data. The second look-up table LUT for Green compares W data Wpre of the previous frame and W data Wcur of the current frame at the third clock timing to output W modulation data. The third look-up table LUT for Blue compares R data Rpre of the previous frame and R data Rcur of the current frame at the third clock timing to output R modulation data.

The first look-up table LUT for RED compares G data Gpre of the previous frame and G data Gcur of the current frame at a fourth clock timing to output G modulation data. The second look-up table LUT for Green compares B data Bpre of the previous frame and B data Bcur of the current frame at the fourth clock timing to output B modulation data. The third look-up table LUT for Blue compares W data Wpre of the previous frame and W data Wcur of the current frame t at the fourth clock timing o output W modulation data.

Figure 12:
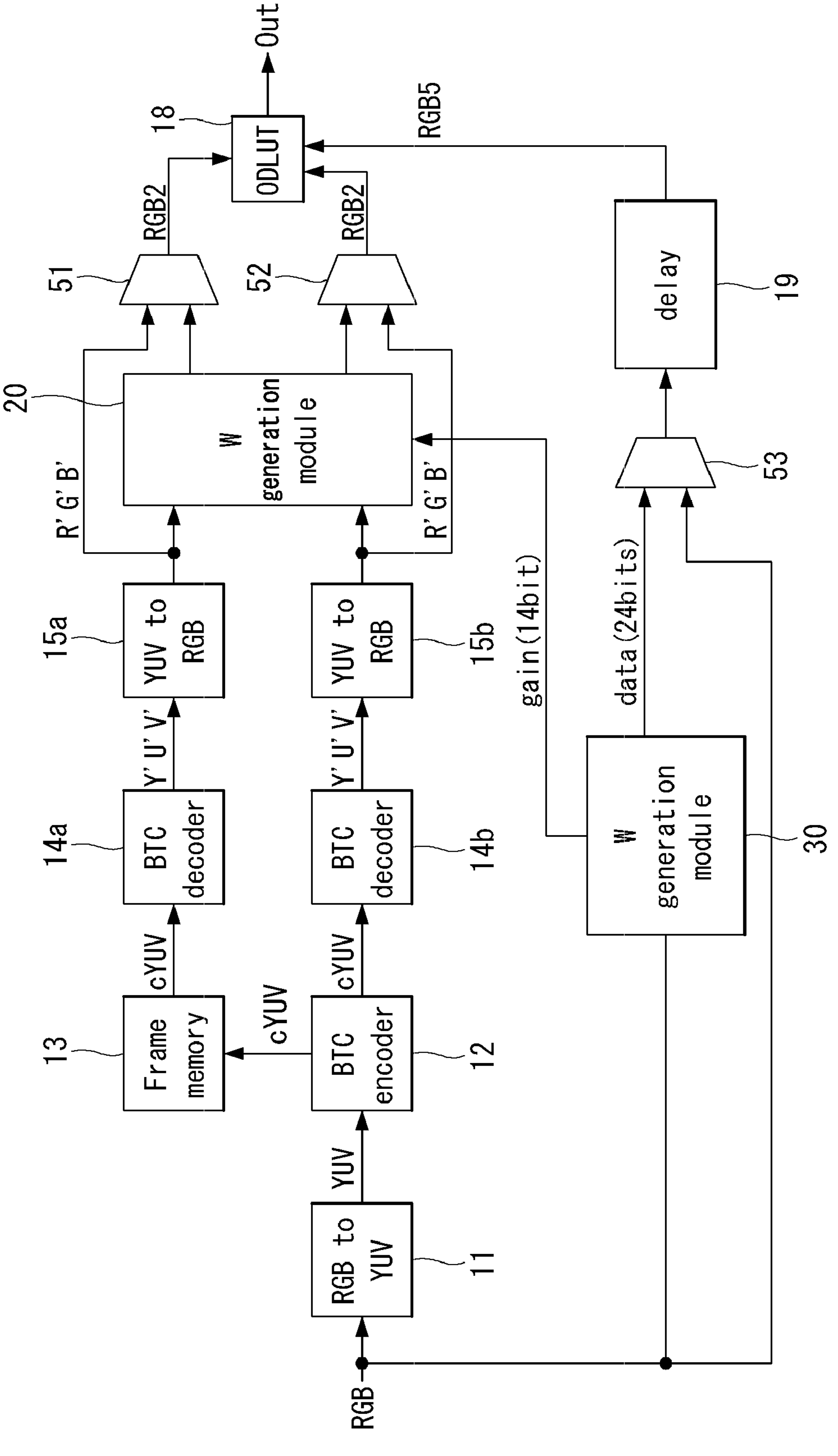
FIG. 12 is a diagram showing a display device according to another example embodiment of the present invention.

FIG. 12 is a diagram showing a display device according to another example embodiment of the present invention. In this example embodiment, the over-driving circuit 108 may employ one or more multiplexers to allow application to both the RGB-type display device and the RGBW-type display device.

In the example shown in FIG. 12, the over-driving circuit 108 comprises a RGB to YUV data converter 11, a BTC encoder 12, a frame memory 13, first and second BTC decoders 14*a* and 14*b*, first and second YUV to RGB data converters 15*a* and 15*b*, a first W generation module 20, a second W generation module 30, a delay unit 19, a data modulator ODLUT 18, and multiplexers 51, 52, and 53.

The first multiplexer 51 selects either 3-color data R'G'B' of the previous frame not input into the first W generation module 20 or 4-color data of the previous frame output from the first W generation module 20. For the RGB-type display device, the first multiplexer 51 selects the 3-color data R'G'B' of the previous frame not input into the first W generation module 20 and outputs it to the data modulator 18. On the other hand, for the RGBW-type display device, the first multiplexer 51 selects the 4-color data output from the first generation module 20 and outputs it to the data modulator 18.

The second multiplexer 52 selects either 3-color data R'G'B' of the current frame not input into the first W generation module 20 or 4-color data of the current frame output from the first W generation module 20. For the RGB-type display device, the second multiplexer 52 selects the 3-color data R'G'B' of the current frame not input into the first W generation module 20 and outputs it to the data modulator 18. On the other hand, for the RGBW-type display device, the second multiplexer 52 selects the 4-color data output from the first generation module 20 and outputs it to the data modulator 18.

The third multiplexer 53 selects either input 3-color data RGB or 4-color data of the current frame output from the second W generation module 30. For the RGB-type display device, the third multiplexer 53 selects the input 3-color data RGB and outputs it to the data modulator 18. On the other hand, for the RGBW-type display device, the third multiplexer 53 selects the 4-color data output from the second W generation module 30 and outputs it to the data modulator 18.

The first to third multiplexers 51 to 53 select data according to their control terminal voltage. The control terminals of the multiplexers 51 to 53 may be connected to a power source voltage VCC or a ground voltage GND. Also, the first to third multiplexers 51 to 53 may be controlled according to the settings of an EEPROM (electrical erasable read only memory) connected to the timing controller 106.

As stated above, the over-driving circuit of this invention is made by connecting a 4-color data generation module to an over-driving circuit for 3-color data, thus allowing easy separation of brightness data and color difference data without increasing the frame memory capacity. Also, the over-driving circuit of the present invention can be compatible with both the RGB-type and RGBW-type display devices. Moreover, the over-driving circuit of this invention can reduce the circuit size by simplifying the circuit configuration and reduce the required frame memory capacity by increasing the compression rate of data stored in the frame memory.

It will be apparent to those skilled in the art that various modifications and variations can be made in the over-driving circuit and display device having an over-driving circuit of the present invention without departing from the spirit or scope of the invention. Thus, it is intended that the present invention cover the modifications and variations of this invention provided they come within the scope of the appended claims and their equivalents.

What is claimed is:

1. An over-driving circuit for a display device having a display panel, the over-driving circuit comprising:
- a first 4-color data generation module including a first white encoder and a second white encoder,
- the first white encoder configured to:
  - determine 4-color data of the previous frame based on 3-color data of the previous frame, and
  - generate output 4-color data of the previous frame based on the 4-color data determined for the previous frame and a delayed gain received from a second 4-color generation module;
- the second white encoder configured to:
  - determine 4-color data of the current frame based on 3-color data of the current frame, and
  - generate output 4-color data of the current frame based on the 4-color data determined for the current frame and a gain of the current frame received from the second 4-color data generation module;
- the second 4-color data generation module configured to:
  - generate input 4-color data based on input 3-color data,
  - calculate the gain of the current frame from the input 4-color data,
  - output the gain of the current frame to the first and second white encoders of the first 4-color data generation module, and
  - multiply the input 4-color data by the gain of the current frame to generate 4-color data output to a first delay unit;
- the first delay unit configured to delay the 4-color data output from the second 4-color data generation module; and
- a data modulator configured to generate modulated data based on the output 4-color data of the previous frame, the output 4-color data of the current frame, and the delayed 4-color data received from the first delay unit.

2. The over-driving circuit of claim 1, further comprising:

a first data converter configured to separate the input 3-color data into brightness data and color difference data;

a compression encoder configured to compress the brightness data and to output the compressed brightness data and the color difference data;

a frame memory configured to store the compressed brightness data and the color difference data;

a first compression decoder configured to decompress compressed brightness data of the previous frame from the frame memory, and to output the decompressed brightness data and the color difference data of the previous frame;

a second compression decoder configured to decompress the compressed brightness data input from the compression encoder, and to output the decompressed brightness data and the color difference data of the current frame;

a second data converter configured to convert the data output from the first compression decoder into the 3-color data of the previous frame; and a third data converter configured to convert the data output from the second compression decoder into the 3-color data of the current frame.

3. The over-driving circuit of claim 1, wherein the first 4-color data generation module comprises:

the first white encoder configured to multiply the 4-color data determined for the previous frame by the delayed gain to generate final 4-color data of the previous frame;

the second white encoder configured to multiply the 4-color data determined for the current frame by the gain of the current frame to generate final 4-color data of the current frame;

a second delay unit configured to delay the gain of the current frame and to supply the delayed gain to the first white encoder;

a first pixel rendering part configured to render the final 4-color data of the previous frame according to a pixel array structure of the display panel to generate the output 4-color data of the previous frame; and a second pixel rendering configured to render the final 4-color data of the current frame according to the pixel array structure of the display panel to generate the output 4-color data of the current frame.

4. The over-driving circuit of claim 1, wherein the second 4-color data generation module comprises:

a gain generator configured to determine the gain of the current frame;

a third encoder configured to multiply 4-color data obtained from the input 3-color data by the gain of the current frame to generate the input 4-color data; and a third pixel rendering part configured to render the input 4-color data according to a pixel array structure of the display panel.

5. The over-driving circuit of claim 1, wherein the data modulator is configured to modulate three of first, second, third, and fourth color data of the input 4-color data at a clock timing in a rotating order based on a pixel array structure of the display panel.

6. The over-driving circuit of claim 5, wherein the data modulator comprises:

a first look-up table configured to output first color modulation data based on first color data of the previous frame and first color data of the current frame at a first clock timing, to output second color modulation data based on second color data of the previous frame and second color data of the current frame at a second clock timing, to output third color modulation data based on third color data of the previous frame and third color data of the current frame at a third clock timing, and to output fourth color modulation data based on fourth color data of the previous frame and fourth color data of the current frame at a fourth clock timing;

a second look-up table configured to output fourth color modulation data based on fourth color data of the previous frame and fourth color data of the current frame at the first clock timing, to output first color modulation data based on first color data of the previous frame and first color data of the current frame at the second clock timing, to output second color modulation data based on second color data of the previous frame and second color data of the current frame at the third clock timing, and to output third color modulation data based on third color data of the previous frame and third color data of the current frame at the fourth clock timing; and a third look-up table configured to output third color modulation data based on third color data of the previous frame and third color data of the current frame at the first clock timing, to output fourth color modulation data based on fourth color data of the previous frame and fourth color data of the current frame at the second clock timing, to output first color modulation data based on first color data of the previous frame and first color data of the current frame at the third clock timing, and to output second color modulation data based on second color data of the previous frame and second color data of the current frame at the fourth clock timing.

7. A display device, comprising:

a display panel having a plurality of data lines, a plurality of gate lines crossing the data lines, and a plurality of pixels arranged in a matrix form;

a data driver configured to supply data voltages to the data lines based on modulated data;

a timing controller configured to control the data driver; and an over-driving circuit configured to receive input 3-color data and to generate the modulated data, the over-driving circuit including:

a first 4-color data generation module including a first white encoder and a second white encoder, the first white encoder configured to:

determine 4-color data of the previous frame based on 3-color data of the previous frame, and generate output 4-color data of the previous frame based on the 4-color data determined for the previous frame and a delayed gain received from a second 4-color generation module;

the second white encoder configured to:

determine 4-color data of the current frame based on 3-color data of the current frame, and generate output 4-color data of the current frame based on the 4-color data determined for the current frame and a gain of the current frame received from the second 4-color data generation module;

the second 4-color data generation module configured to:

generate input 4-color data based on the input 3-color data, calculate the gain of the current frame from the input 4-color data, output the gain of the current frame to the first and second white encoders of the first 4-color data generation module, and multiply the input 4-color data by the gain of the current frame to generate 4-color data output to a first delay unit;

the first delay unit configured to delay the 4-color data output from the second 4-color data generation module; and a data modulator configured to generate modulated data based on the output 4-color data of the previous frame, the output 4-color data of the current frame, and the delayed 4-color data received from the first delay unit.

8. The display device of claim 7, wherein the over-driving circuit is part of the timing controller.

9. The display device of claim 7, wherein the over-driving circuit further includes:

a first data converter configured to separate the input 3-color data into brightness data and color difference data;

a compression encoder configured to compress the brightness data and to output the compressed brightness data and the color difference data;

a frame memory configured to store the compressed brightness data and the color difference data;

a first compression decoder configured to decompress compressed brightness data of the previous frame from the frame memory, and to output the decompressed brightness data and the color difference data of the previous frame;

a second compression decoder configured to decompress the compressed brightness data input from the compression encoder, and to output the decompressed brightness data and the color difference data of the current frame;

a second data converter configured to convert the data output from the first compression decoder into the 3-color data of the previous frame; and a third data converter configured to convert the data output from the second compression decoder into the 3-color data of the current frame.

10. The display device of claim 7, wherein the first 4-color data generation module includes:

the first white encoder configured to multiply the 4-color data determined for the previous frame by the delayed gain to generate final 4-color data of the previous frame;

the second white encoder configured to multiply the 4-color data determined for the current frame by the gain of the current frame to generate final 4-color data of the current frame;

a second delay unit configured to delay the gain of the current frame and to supply the delayed gain to the first white encoder;

a first pixel rendering part configured to render the final 4-color data of the previous frame according to a pixel array structure of the display panel to generate the output 4-color data of the previous frame; and a second pixel rendering configured to render the final 4-color data of the current frame according to the pixel array structure of the display panel to generate the output 4-color data of the current frame.

11. The display device of claim 7, wherein the second 4-color data generation module includes:

a gain generator configured to determine the gain of the current frame based on 4-color data obtained from the input 3-color data;

a third encoder configured to multiply the 4-color data obtained from the input 3-color data by the gain of the current frame to generate the input 4-color data; and a third pixel rendering part configured to render the input 4-color data according to a pixel array structure of the display panel.

12. The display device of claim 7, wherein the data modulator is configured to modulate three of first, second, third, and fourth color data of the input 4-color data at a clock timing in a rotating order based on a pixel array structure of the display panel.

13. The display device of claim 12, wherein the data modulator includes:

a first look-up table configured to output first color modulation data based on first color data of the previous frame and first color data of the current frame at a first clock timing, to output second color modulation data based on second color data of the previous frame and second color data of the current frame at a second clock timing, to output third color modulation data based on third color data of the previous frame and third color data of the current frame at a third clock timing, and to output fourth color modulation data based on fourth color data of the previous frame and fourth color data of the current frame at a fourth clock timing;

a second look-up table configured to output fourth color modulation data based on fourth color data of the previous frame and fourth color data of the current frame at the first clock timing, to output first color modulation data based on first color data of the previous frame and first color data of the current frame at the second clock timing, to output second color modulation data based on second color data of the previous frame and second color data of the current frame at the third clock timing, and to output third color modulation data based on third color data of the previous frame and third color data of the current frame at the fourth clock timing; and a third look-up table configured to output third color modulation data based on third color data of the previous frame and third color data of the current frame at the first clock timing, to output fourth color modulation data based on fourth color data of the previous frame and fourth color data of the current frame at the second clock timing, to output first color modulation data based on first color data of the previous frame and first color data of the current frame at the third clock timing, and to output second color modulation data based on second color data of the previous frame and second color data of the current frame at the fourth clock timing.

14. A display device, comprising:

a display panel having a plurality of data lines, a plurality of gate lines crossing the data lines, and a plurality of pixels arranged in a matrix form;

a data driver configured to supply data voltages to the data lines based on modulated data;

a timing controller configured to control the data driver; and an over-driving circuit configured to receive input 3-color data and to generate the modulated data, the over-driving circuit including:

a white generation module comprising:

a first 4-color data generation module including a first white encoder and a second white encoder, the first white encoder configured to:

determine 4-color data of the previous frame based on 3-color data of the previous frame, and generate output 4-color data of the previous frame based on the 4-color data determined for the previous frame and a delayed gain received from a second 4-color generation module;

the second white encoder configured to:

determine 4-color data of the current frame based on 3-color data of the current frame, and generate output 4-color data of the current frame based on the 4-color data determined for the current frame and a gain of the current frame received from the second 4-color data generation module;

the second 4-color data generation module configured to:

generate input 4-color data based on the input 3-color data, calculate the gain of the current frame from the input 4-color data, output the gain of the current frame to the first and second white encoders of the first 4-color data generation module, and multiply the input 4-color data by the gain of the current frame to generate 4-color data output to a first delay unit;

a first multiplexer configured to select either the 3-color data of the previous frame or the output 4-color data of the previous frame;

a second multiplexer configured to select either the 3-color data of the current frame or the output 4-color data of the current frame;

a third multiplexer configured to select either the input 3-color data or the input 4-color data; and a data modulator configured to generate the modulated data based on the data selected by at least one of the first, second, and third multiplexers.

15. The display device of claim 14, wherein the overdriving circuit further includes:

a first data converter configured to separate the input 3-color data into brightness data and color difference data;

a compression encoder configured to compress the brightness data and to output the compressed brightness data and the color difference data;

a frame memory configured to store the compressed brightness data and the color difference data;

a first compression decoder configured to decompress compressed brightness data of the previous frame from the frame memory, and to output the decompressed brightness data and the color difference data of the previous frame;

a second compression decoder configured to decompress the compressed brightness data input from the compression encoder, and to output the decompressed brightness data and the color difference data of the current frame;

a second data converter configured to convert the data output from the first compression decoder into the 3-color data of the previous frame; and a third data converter configured to convert the data output from the second compression decoder into the 3-color data of the current frame.

16. The display device of claim 14, wherein the data modulator includes:

at least one look-up table configured to output modulation data based on the data selected by the first multiplexer and the data selected by the second multiplexer.

17. The display device of claim 16, wherein the data modulator further includes:

a subtraction operator configured to subtract the modulation data from the data selected by the second multiplexer.

18. The display device of claim 16, wherein the modulation data is preset and stored in the at least one look-up table.

19. The display device of claim 16, wherein the data modulator further includes:

an addition operator configured to add the modulation data to the data selected by the third multiplexer to generate the modulated data.

* * * * *